United States Patent

Cooper et al.

[11] Patent Number: 5,994,122
[45] Date of Patent: Nov. 30, 1999

[54] COMPOSTER WITH SLANTED SHELVES

[75] Inventors: Raymond Cooper, Wellington; Michael Hugh Smythe, Auckland, both of New Zealand

[73] Assignee: Prodevco (NZ) Limited, Auckland, New Zealand

[21] Appl. No.: 08/793,173

[22] PCT Filed: Aug. 30, 1995

[86] PCT No.: PCT/NZ95/00077

§ 371 Date: May 12, 1997

§ 102(e) Date: May 12, 1997

[87] PCT Pub. No.: WO96/06815

PCT Pub. Date: Mar. 7, 1996

[30] Foreign Application Priority Data

Aug. 31, 1994 [NZ] New Zealand .......................... 264356

[51] Int. Cl.⁶ ................................................. C05F 9/02
[52] U.S. Cl. .................................. 435/290.1; 435/290.4; 435/294.1; 220/501; 220/909
[58] Field of Search ........................ 435/262, 290.1, 435/290.4, 291.4, 293.1, 294.1; 71/9; 220/501, 908, 909, 913

[56] References Cited

U.S. PATENT DOCUMENTS

| | | |
|---|---|---|
| 1,220,422 | 3/1917 | Hewitt . |
| 2,026,169 | 12/1935 | Guckenheimer . |
| 2,043,265 | 6/1936 | Roeder . |
| 3,413,124 | 11/1968 | Akin . |
| 4,084,937 | 4/1978 | Beach . |
| 5,690,249 | 11/1997 | Karlsten . |

FOREIGN PATENT DOCUMENTS

| | | |
|---|---|---|
| 71569/94 | 3/1995 | Australia . |
| 0 538 579 | 4/1993 | European Pat. Off. . |
| 30 04 016 | 8/1981 | Germany . |
| 39 10847 | 10/1990 | Germany . |
| 5-330967 | 12/1993 | Japan ................................. 435/290.1 |

Primary Examiner—William H. Beisner
Attorney, Agent, or Firm—Jacobson, Price, Holman & Stern, PLLC

[57] ABSTRACT

A composter capable of being formed from a number of moulded components which allows top filling and bottom removal of materials to be composted and composted materials respectively. A feature of the invention is the provision in major components of a ledge or the like form which supports the material to be composted at a variety of different heights in the assembly and which allows the serial cascading down of the materials as more material is loaded and/or as the material composts. Provision is made for closing the top and bottom of the component assembly. The major components are preferably rotationally moulded in a suitable plastics material and the arrangement is such that a full set of components are preferably compactable into a nested form.

19 Claims, 16 Drawing Sheets

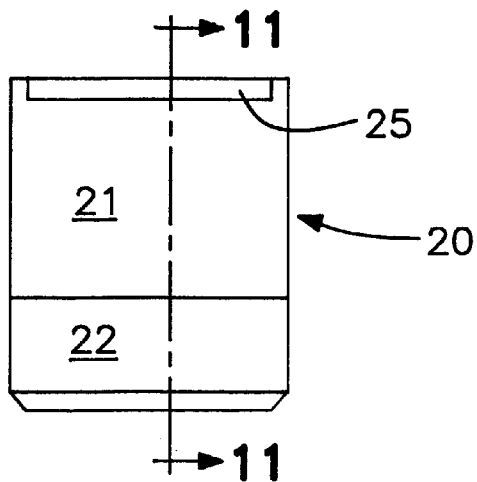
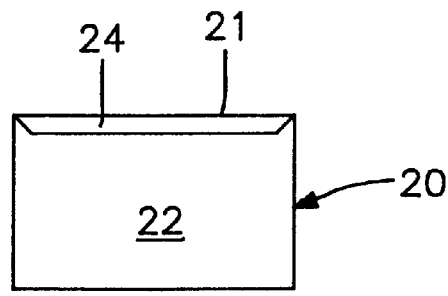
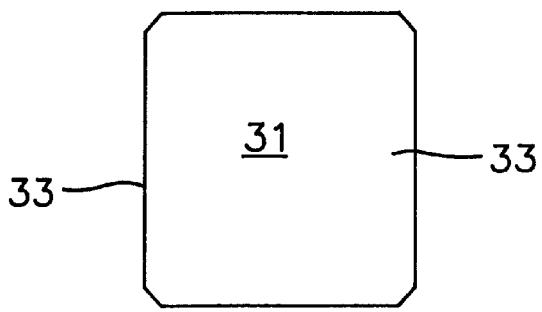
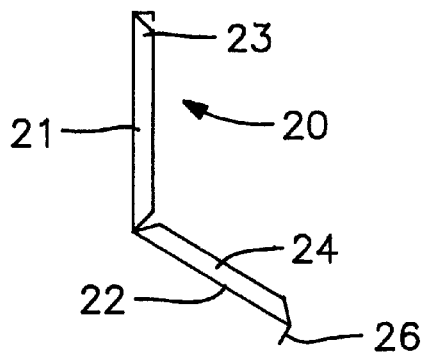
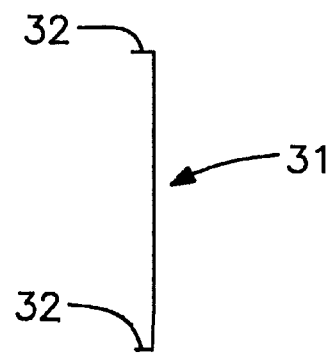
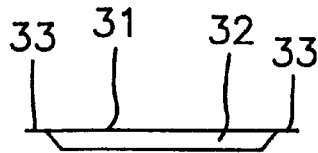

FIG. 42
FIG. 43  FIG. 41
 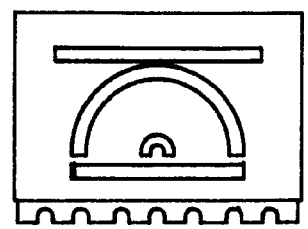
FIG. 51
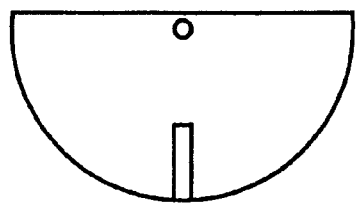
FIG. 52  FIG. 50
 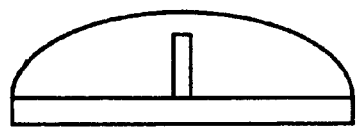

COMPOSTER WITH SLANTED SHELVES

TECHNICAL FIELD

This invention relates to a composter and has been designed, particularly though not necessarily solely, for use as a garden composter.

BACKGROUND ART

A typical garden composter or compost bin comprises a receptacle into which food scraps, grass clippings and the like are placed to enable the composting cycle to take place. A problem with such constructions is that in general the older material is at the bottom of the composter and therefore cannot be used until at least a substantial amount of the material in the compost bin is ready for use. There exists a need therefore for a composter which will enable the older material to be removed before newer material.

It is therefore an object of the present invention to provide a composter which will go at least some distance to meeting the foregoing requirement or which will at least provide the public with a useful choice.

DISCLOSURE OF INVENTION

In a first aspect the invention comprises a composter comprising means defining or assemblable to define at least three composting compartments in a vertical inter-relationship, the top most compartment including an inlet for material to be composted (optionally closeable) and the lowermost including an outlet (optionally closeable) for removing composted material, wherein each of the upper at least two compartments provide a support surface (herein referred to as a "shelf") for material being composted until (directly or indirectly) ongoing loading of material through said inlet cascades (preferably already composting or composted) material into a lower said compartment onto a support surface.

The term "shelf" is not to be considered as restricted to planar nor regularly shaped shelves.

Preferably means is provided to close said inlet.

Preferably means is provided to close said outlet.

Preferably there are three compartments.

Preferably said means defining or assemblable to define the vertically inter-related compartments is generally round in plan.

Preferably said means defining or assemblable to define the vertically inter-related compartments is formed from a plurality of moulded components.

Preferably said moulded components are formed by rotational or blow moulding.

Preferably said components defining said at least three composting compartments are capable of being self nested with a like component and/or being nested within one of its complimentary components.

Preferably the componentry to define said composting compartments are nestable, one component at least substantially within another and can accommodate any means to close said inlet and/or said outlet.

Preferably said composter is formed largely of a plastics material.

Preferably there are two shelves only.

Preferably each said shelf is substantially bowl or the like shaped but includes eccentrically positioned therein at least one opening to allow said cascading down of composting material onto an out of register shelf below or the support surface or other support of or for the lower most compartment.

Preferably said inlet is in the top of the upper most compartment.

Preferably means is provided to close said inlet, said means being a cover that can be rotated about a substantially vertical rotational access to bring an opening into or out of register with said inlet.

Preferably said outlet is in a side wall of the lower most compartment; there being provided means capable of being moved over said outlet or away from said outlet to allow the removal of composted or composting material from the lower most compartment.

Preferably said means defining the compartments does not define a base to the lower most compartment and a support surface for the apparatus or the ground itself provides the base of said lower most compartment.

In a further aspect the invention is, as a marketable item, a nested composter of the present invention wherein the components thereof are nested to reduce space requirements.

In a further aspect the invention comprises a method of composting material which comprises providing or assembling a composter of the present invention loading at least a first amount of compostable material into said composter and at some subsequent time loading via said inlet said additional composting material until such time as composted or composting material has accumulated in the lower most compartment.

In still a further aspect the invention consists in a composter comprising a container, a plurality of support surfaces ("shelves") in said container, said shelves being positioned and the container being loadable such that in use material from a higher shelf can fall onto a lower shelf, said container having an opening at or near the bottom thereof in use to enable material to be withdrawn from the container.

Preferably each shelf is angled downwardly from a horizontal plane.

Preferably lower shelves have a greater downward inclination than upper shelf or shelves.

Preferably at least three shelves are provided.

Preferably said first shelf is angled downwardly between substantially 5° and substantially 30°.

Preferably a second shelf is angled downwardly between substantially 15° and substantially 45°.

Preferably a third shelf is angled downwardly between substantially 15° and substantially 45°.

Preferably an angled back member is provided.

Preferably said angled back member is angled downwardly between 45° and 80°.

Preferably said container includes a front panel, said opening being formed by a gap below said front panel, one said shelf extending inwardly from or adjacent the bottom edge of said front panel.

Preferably a door is provided to allow said gap below said front panel to be substantially closed.

Preferably a pair of said and back panel are provided each said and back panel being formed in a substantially "L" shape in cross-section.

Preferably said side and back panel are placed adjacent one another to form said back.

Preferably a bottom panel is provided.

Preferably said bottom panel and said angled back panel are provided in the form of a single member.

In a further aspect the invention may broadly be said to consist in a kit of parts erectable into a composter according to the preceding paragraph.

In a still further aspect the invention consists in a method of forming compost comprising the steps of providing a composter according to the preceding paragraph, from time to time inserting compostable material into an upper part of said composter and from time to time withdrawing material from a lower part of said composter.

BRIEF DESCRIPTION OF DRAWINGS

Preferred forms of the invention will be described with reference to the accompanying drawings in which.

FIG. 9 is a front elevation of a combined front panel and shelf for use in the composter of FIG. 1, FIG. 10 is a plan view of the construction of FIG. 9, FIG. 11 is a cross section on "11—11" in FIG. 9, FIG. 12 is a front elevation of a door for use in the composter of FIG. 1, FIG. 13 is a side elevation of the construction of FIG. 12, FIG. 14 is a plan view of the construction of FIG. 12.

FIG. 41 is a front elevational view of a door for the base unit of FIGS. 38 through 40, FIG. 42 is a plan view of the door of FIG. 41, FIG. 43 is a section of the door of FIGS. 41 and 42 (see FIG. 56), FIG. 50 is a front elevational view of a lid appropriate for use with the units of FIGS. 38 through 49, FIG. 51 is a plan view of the lid of FIG. 50, FIG. 52 is a sectional view of the lid of FIG. 50.

Referring to FIGS. 1 to 28 of the drawings a composter is provided as follows. The composter 1 is formed by a container and a plurality of shelves are provided in the container. The shelves are positioned so that in use material from a higher shelf can fall onto a lower shelf. In the preferred form there are three shelves one of which also forms a top panel and also an angled back member is provided which is integral with the bottom panel of the container. The shelves are downwardly inclined from the horizontal and generally the angle from the horizontal increases as one moves down the container. Thus, in the preferred form of the invention the container 1 has a pair of side and back panels 2, one of which is left handed and the other of which is right handed, so that the backs can be joined together to form a construction providing the sides 3 and back 4 of the container. The panel 2 is substantially L-shaped in cross section having a side wall 5 and a back wall 6. The outer extremity of the back wall 6 preferably has an inturned flange 7 and the outward extremity of the side wall 5 also desirably have an inwardly extending web 10 and 11 respectively terminating in downwardly extending flanges 12 and 13. The two back and side panels 2 are placed the flanges 7 adjacent.

Figure 1:
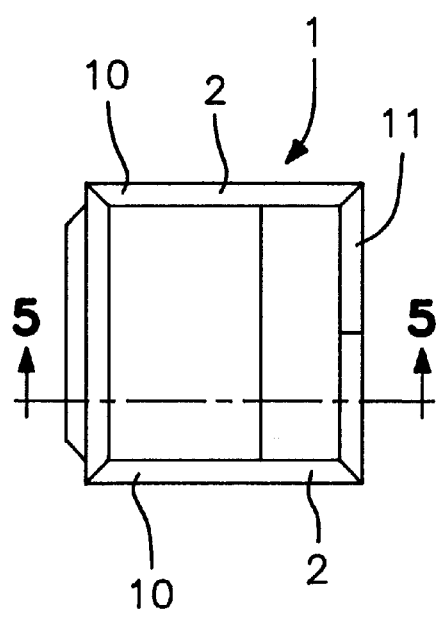
FIG. 1 is a plan view of a composter according to one preferred form of the invention.
Figure 2:
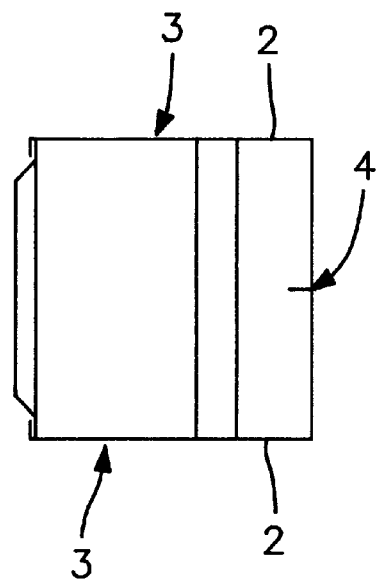
FIG. 2 is a cross-section of "2—2" in FIG. 5.
Figure 3:
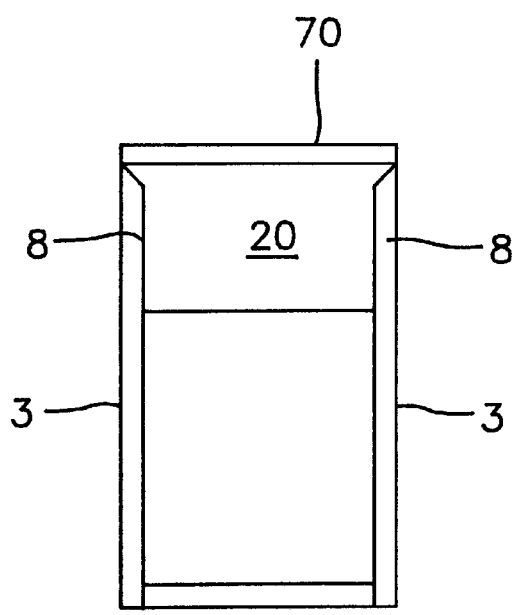
FIG. 3 is a front elevation of the composter of FIG. 1.
Figure 4:
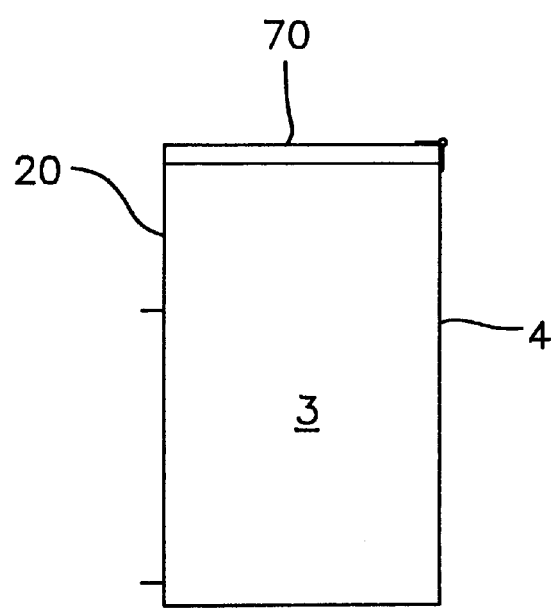
FIG. 4 is a side elevation of the composter of FIG. 1.

The front of the container is provided by a panel 20.

The panel 20 has a front wall 21 and extending inwardly from the front wall 21 is a shelf 22. The front wall 21 and the shelf 22 may have inturned flanges 23 and 24 respectively and the upper edge of the front panel 21 has a web 24 and a downwardly depending flange 25. The outer edge of the shelf 22 preferably carries a downturned flange 26. The flanges 23 and 24 may be affixed in any desired manner to the side walls 3. Thus, a gap or opening 30 is provided in use below the front panel 21 and this may be closed with a door or gate. The door or gate may be provided by a sliding panel 31 having out-turned flanges 32 at the upper and lower edges thereof. The flanges 32 do not extend to the side edges of the panel 31 being cut back therefrom so that the edge extremities 33 of the sliding panel 31 may be positioned between the inturned flange 8 of the side and back panels 2 and the front wall 21 of the panel 20. Above the shelf 22 is provided a shelf 40 which takes the form of a shelf like structure. The front of the shelf 40 may be downturned to form a flange 41 and the sides downturned to form a flange 42. Also, the rear edge of the shelf 40 may be downturned to form a flange at 43 and substantially midpoint inwardly extending slot 44 is provided. The slot is arranged so that the two flanges 7 on the back panel 4 may be positioned in the slot 44. The rear flange 43 is set at an angle so that the shelf 40, when in position, extends downwardly forwardly of the container as can be seen for example in FIG. 5. This angle is desirably between substantially 15° and substantially 45°, for example, about 20°. The flanges 40 and 43 can also be affixed to the adjacent side or back walls of the container. The shelf 22 is also set downwardly at an angle from the horizontal being inclined downwardly rearwardly of the container, again at an angle of about 15° to 45°. A top panel is also provided for the construction and the top panel includes a shelf or the like 50 having upturned side flanges 51 and a downturned front flange 52. An upturned flange 53 may be provided on the edge opposite the downturned flange 52. This shelf 50 is positioned in the top of the container and the side flanges 51 may be connected to the side walls 3. Again the shelf 50 is set an angle for example an angle substantially between 5° and 30° down from the horizontal.

Figure 5:
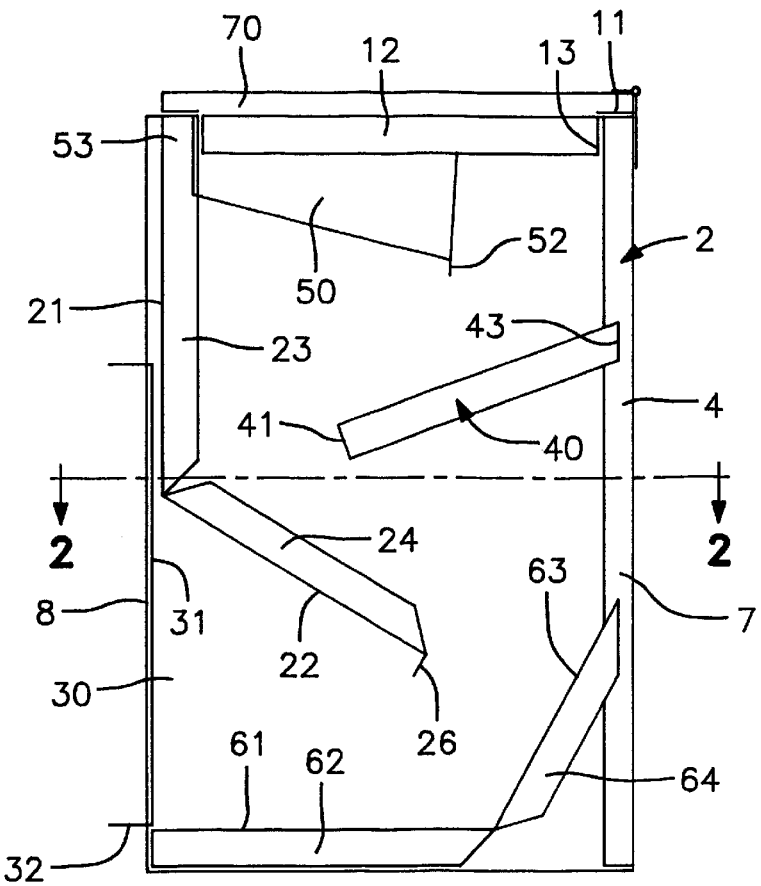
FIG. 5 is a cross-section on "5—5" in FIG. 1.
Figure 6:
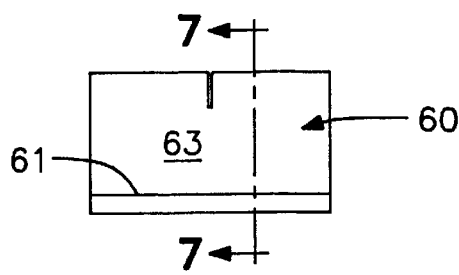
FIG. 6 is a front elevation of a bottom and angled back panel for use in the composter of FIG. 1.
Figure 8:
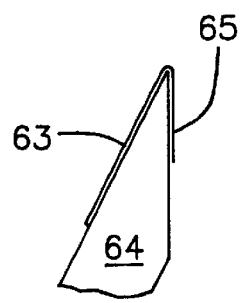
FIG. 8 is an enlarged detail of the circled area in FIG. 7.
Figure 7:
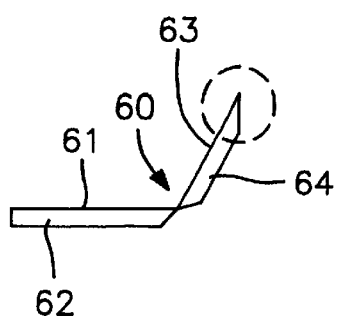
FIG. 7 is a cross-section on "7—7" on FIG. 6.
Figure 15:
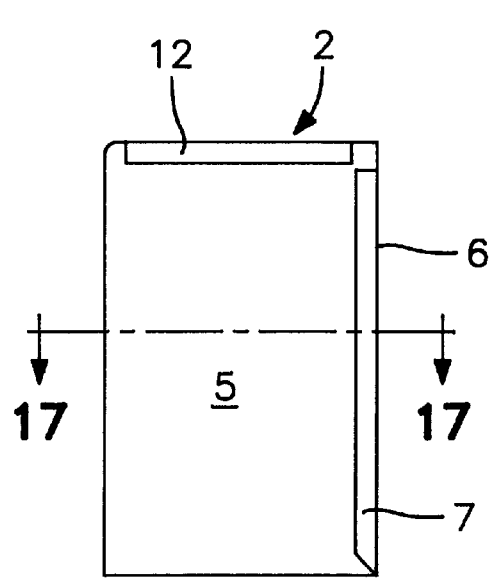
FIG. 15 is a side elevation of a side and back panel for use in the construction in FIG. 1.
Figure 16:
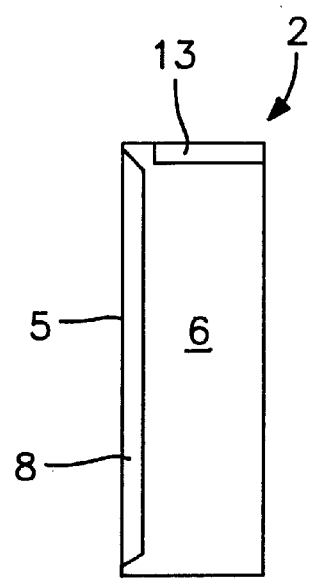
FIG. 16 is a front elevation of a left hand unit of the construction of FIG. 15.
Figure 17:
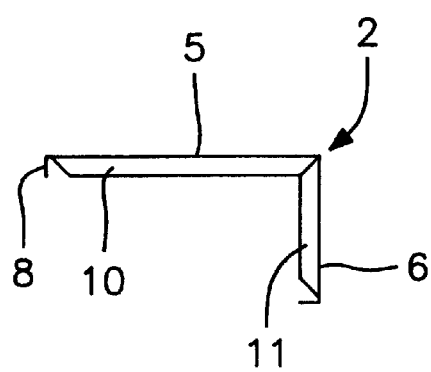
FIG. 17 is a cross section of "17—17" of a left hand side and back panel in FIG. 15.
Figure 18:
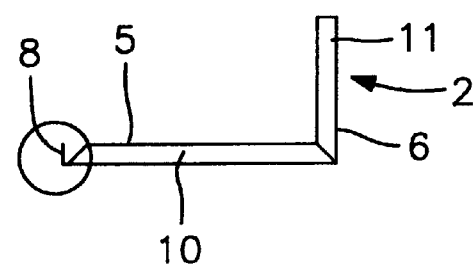
FIG. 18 is a plan view of a right hand side and back panel as shown in FIG. 15.
Figure 19:
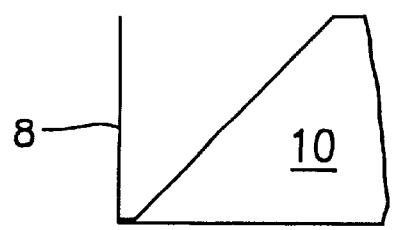
FIG. 19 is a detail of the circled are on FIG. 18.

A bottom panel and inclined back panel are also desirably provided. The bottom and inclined back panel 60 includes a bottom surface 61 which may have downturned side flanges 62 and an inclined back face 63 which may also have rearwardly turned side flanges 64 and a downturned back flange 65. The side and back flanges 64 and 65 may be connected to the adjacent side wall 3 and back wall 4 and again the downturned flange 62 may be connected to the side wall 3. The angle from the horizontal of the back panel 63 may be, for example, from substantially 45° to substantially 90°. The construction has been described with three shelves and the inclined back panel 64. It will be apparent that a different number of shelves could be provided but the construction is such that material on one shelf may fall to the lower shelf in use. The shelves as shown in FIG. 5 extend about two-thirds of the distance across the container and although this is not necessarily a precise distance, extension into the container of about this distance is believed to be suitable in use.

The container is desirably manufactured from metal such as galvanised time but other materials such as wood or plastics materials could be used. It will be clear that a range of sizes could be produced.

Drain apertures could be provided in the bottom panels 61 and if desired viewing apertures could be provided, for example, in the side walls 3. A lid 70 may be provided to close the container. The lid 70 is desirably hinged to the rest of the container and may have rain holes therein. The lid may be adjustable as to angle and this may be achieved, for example, by providing a strut engaged at one end to the lid or container, and engageable at one of a selected number of positions with the container or lid respectively.

Figure 20:
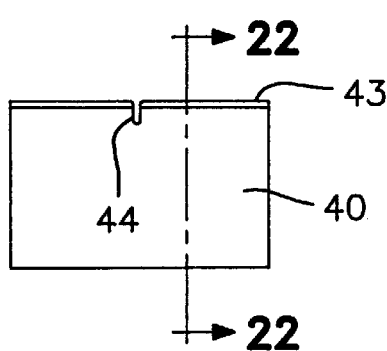
FIG. 20 is a plan view of an intermediate shelf used in the composter of FIG. 1.
Figure 21:
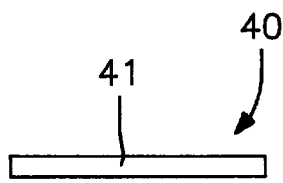
FIG. 21 is a front elevation of the shelf of FIG. 20.
Figure 22:
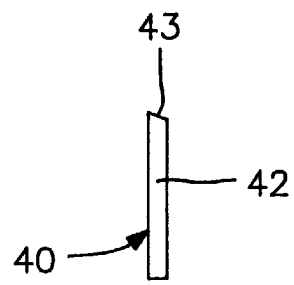
FIG. 22 is a cross section on "22—22" on FIG. 20.
Figure 23:
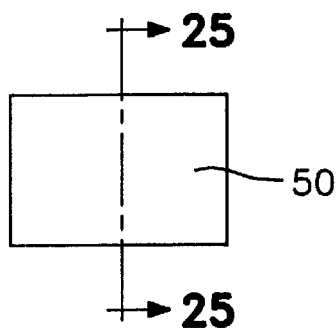
FIG. 23 is a plan view of a top panel or shelf for use in the composter of FIG. 1.
Figure 24:
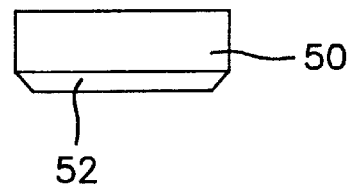
FIG. 24 is a front elevation of the panel or shelf of FIG. 23.
Figure 25:
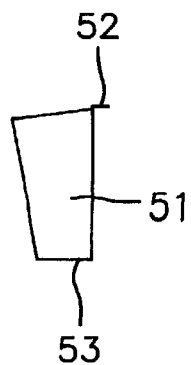
FIG. 25 is a cross section on "25—25" in FIG. 23.
Figure 26:
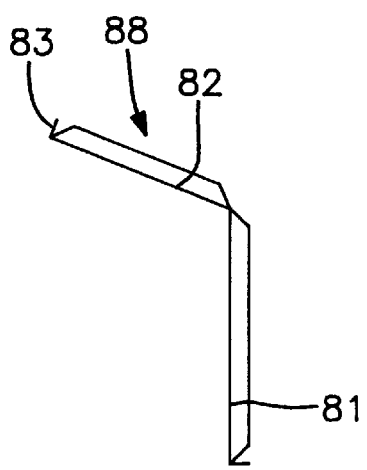
FIG. 26 is a cross section on "26—26" in FIG. 27 of an alternative shelf to that shown in FIGS. 20 to 22.
Figure 27:
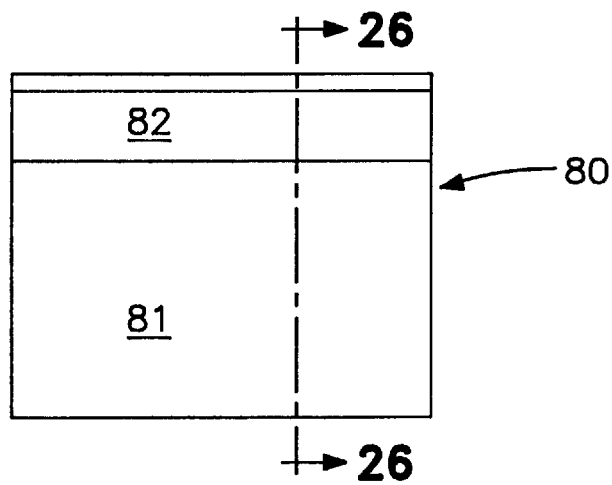
FIG. 27 is a plan view of the alternative shelf.
Figure 28:
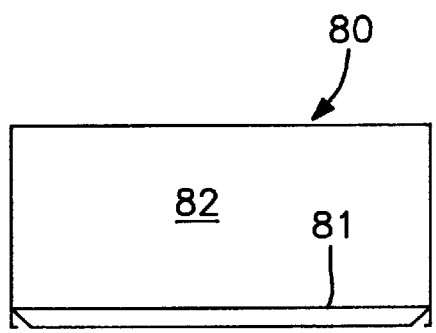
FIG. 28 is a front elevation of the shelf in FIG. 27.

The shelf 80 of FIGS. 26 to 28 is an alternative to the construction of FIGS. 20 to 22 having a shelf part 81 and back part 82. The top flanges may be connected to the underside of web 10.

In use the various panels described above are erected into the container above described. Material such as food scraps, grass clippings and the like may then be positioned onto the top shelf 50 or dropped through the space at the back of the top panel 50 to fall onto the next lower shelf 40. If desired or necessary, water can also be played onto this material. Over a period of time the material in the container will be transformed into compost and will also slide from the shelf 50 to the shelf 40 to the shelf 22 and on to the back wall 63 and finally to the floor panel 61. The door 31 may then be lifted and the compost removed from the floor surface 61.

Further material may be put into the top of the construction and the converted material withdrawn from the bottom thus enabling a continuous compost making cycle to be effected.

Thus it can be seen that in at least the preferred form of the invention a composter is provided which has the advantage that a continuous cycle of compost making can be achieved as the material drops from shelf to shelf and thence to the floor of the construction. It is also an advantage of the construction that it can be provided in a kitset form so as to reduce the bulk of the construction for storage and transportation being able to be readily erected on site by a purchaser. Connections can be made by for example screws, nuts and bolts, pop rivets, welding, clipping, nails, or in any other satisfactory manner.

Figure 29:
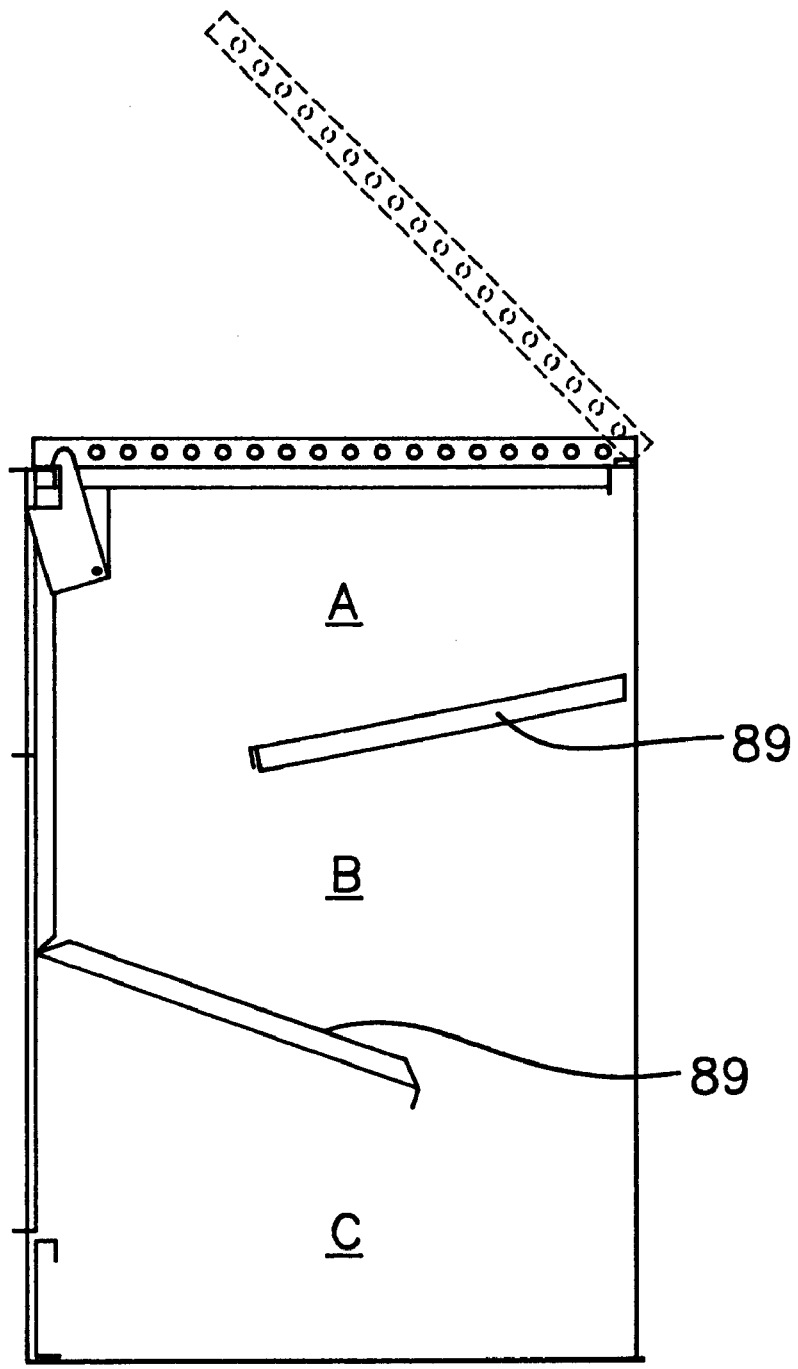
FIG. 29 is a cross sectional view of a two shelf version of a composter showing how 2 shelves only can define 3 vertically aligned compartments, there being provided a tilt openable cover for the top inlet.

FIG. 29 shows an alternative to the form of the apparatus depicted in FIGS. 1 through 28. This form of the apparatus shows two shelf like members 89 defining three chambers A, B and C.

In use the lid would be open and material to be composted would drop from one shelf to another before accumulating as a composted or composting mass in the lower chamber. Obviously, the less frequently the material is loaded the longer the material will have to remain at each level.

If the apparatus of FIG. 29 is formed from metal conductivity between the warmth of the composting material and the exterior can give rise to some condensation problems. In such circumstances it can be seen that vent holes have been provided in the lid and vent holes will be provided elsewhere to avoid moisture accumulation. Such a need for ventilation (a balancing act) however is reduced if for example the material is less thermally conductive. Where however, a less conductive material such as a mouldable plastics material is used then the rectangular or other easily fabricated shapes for the composter, already referred to, are most conveniently avoided.

In the form of the invention shown in FIGS. 30 through 34 preferably the components are moulded by an appropriate moulding process, for example, rotational moulding in relation to the larger components.

Appropriate plastics materials include UV established plastics such as polyethylene, polypropylene, etc.

Figure 31:
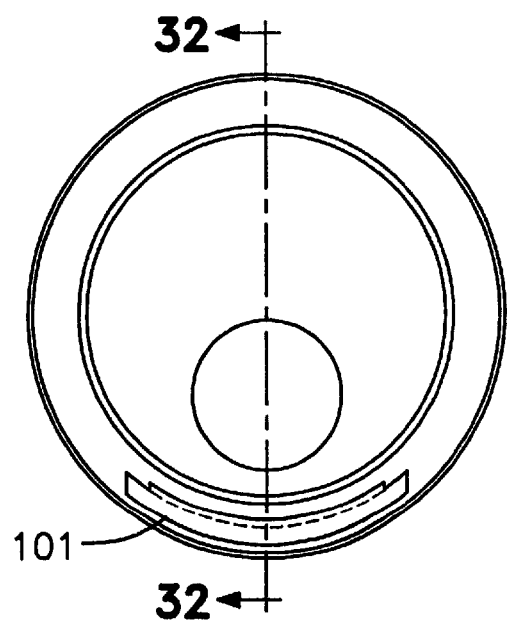
FIG. 31 is plan view of the composter of FIG. 30.
Figure 32:
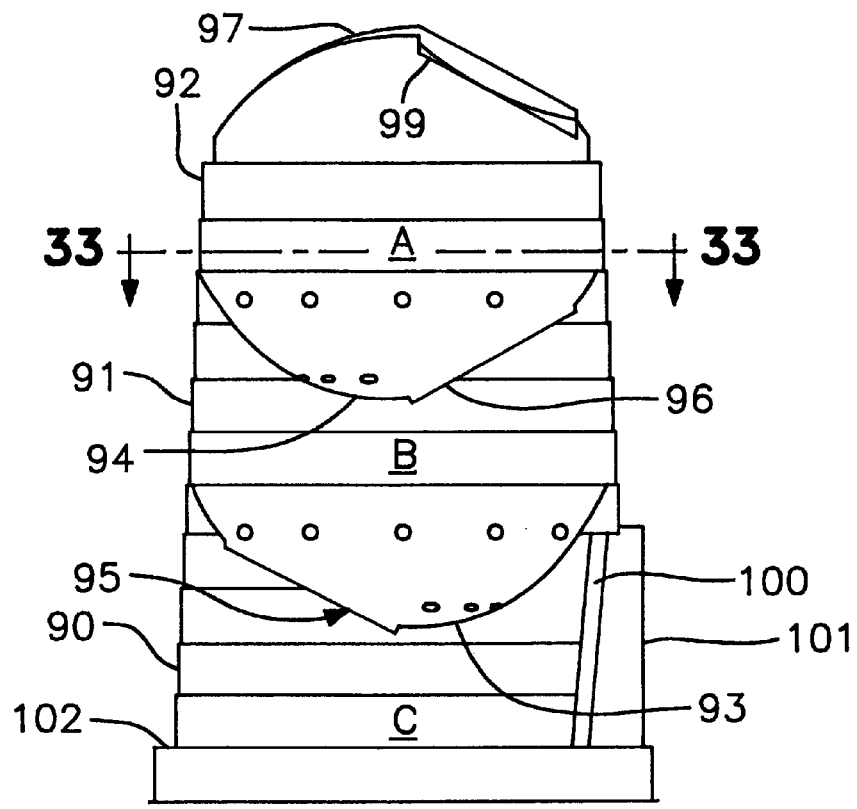
FIG. 32 is the section 32—32 of the composter of FIG. 31, this section being shown in elevation.
Figure 33:
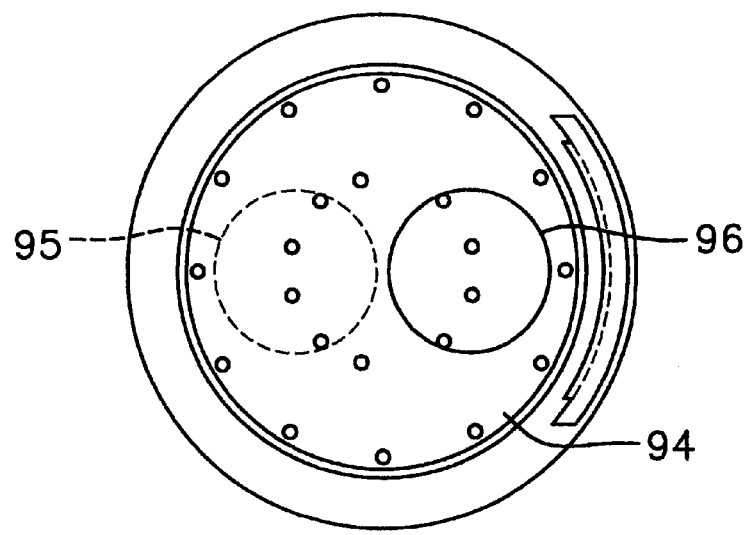
FIG. 33 is the section 33—33 with respect to the composter of FIG. 32 when looking downwardly showing the top most shelf like member with its bowl form (preferably with drainage openings) and its major opening which is out of register with an underlying opening of a like bowl shaped shelf element, the view of FIG. 33 showing the nature of the door structure depicted.

In the form of the invention as shown in FIGS. 30 through 34 there are three major components 90, 91 and 92 with components 90 and 91 defining shelves, 93 and 94 respectively, each with its appropriate opening 95 and 96, to provide the outer register arrangement shown in FIG. 33.

The other two components includes a capping member 97 with an opening 98 capable by rotation about a vertical rotation axis of being brought into and/or out of register with an inlet opening 99 of the member 92.

Figure 30:
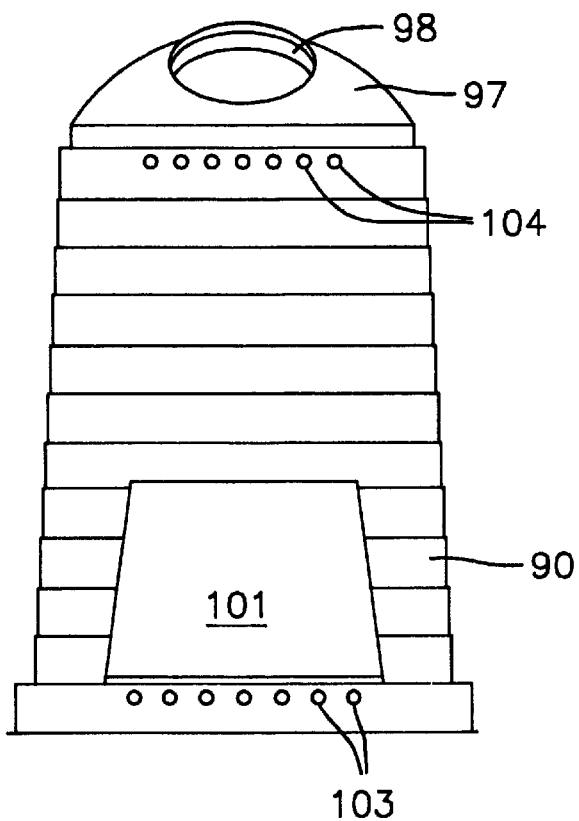
FIG. 30 is a view of a preferred rotationally moulded plastics form of composter in accordance with the present invention formed substantially with a circular cross section when viewed in horizontal planes, but showing for the bottom most compartment a door type structure capable of being moved about the periphery to reveal the outlet for the composted or composting material and showing at the top thereof a rotatable cover have an opening capable of being brought into and/or out of register with an inlet into the top compartment, the arrangement shown in FIG. 30 being formed from three main parts that define the two "shelf" form of the composter and together with the closing means for the inlet and outlet is all that is required.

The outlet 100 is coverable by member 101 which is moveable from the condition shown in FIGS. 30 and 31 around the outside circumference of the member 90 but confined within the annular groove 102 (see FIG. 32). While certain air access openings 103 and 104 are depicted these are preferred only since with the lower thermal conductivity (relative to metal) of the preferred plastics material condensation is less of a difficulty.

Figure 34:
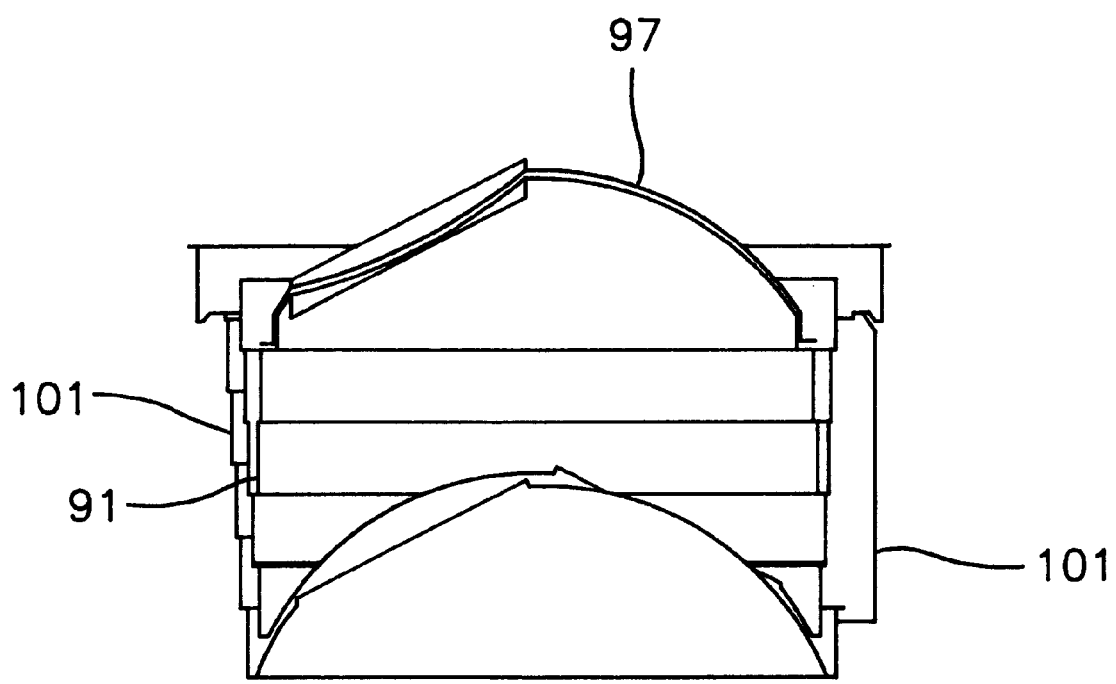
FIG. 34 is a view of the apparatus of FIGS. 30 through 33 as it might be nested for supply to customers at a point of sale, the nested components being shown in section similar to that shown in FIG. 32 but for convenience not showing the various preferred drainage holes etc.

With the configurations depicted through FIGS. 30 to 33 inclusive, the nested arrangement shown in FIG. 34 is possible. Indeed with the arrangement shown in FIG. 34 the whole arrangement could be bagged or shrink wrapped. Alternatively like components can be separately nested or accumulated.

In operation it can be seen particularly with reference to FIG. 32 how the arrangement of the plastics moulded unit is much the same as that depicted in FIG. 29, ie; there are compartments A, B and C as before with the three compartments being separated by the shelf like members 93 and 94.

With the preferred bowl forms and the minimal openings it is possible to ensure a greater tendency for composting or composted material to cascade from one compartment, eg A to B and subsequently B to C, rather than non composting or composted materials.

Figure 35:
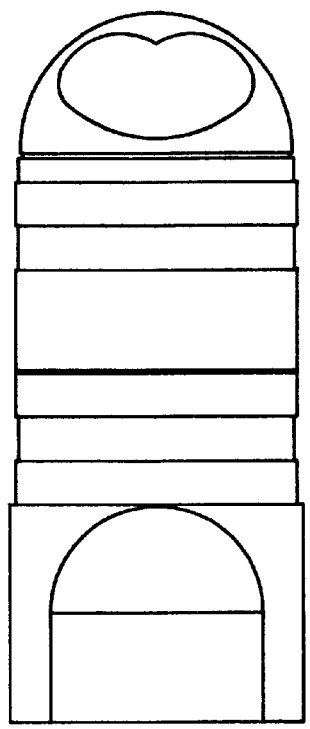
FIG. 35 is a form of the invention manufacturered preferably in seven pieces or seven sub-assemblies capable of being nested, each or at least some of the components being formable by blow moulding, FIG. 35 showing the assembled apparatus as it would be assembled in use from a direction which includes a preferred step forming closure for the lower outlet and showing the rotational form of cover for the inlet.
Figure 36:
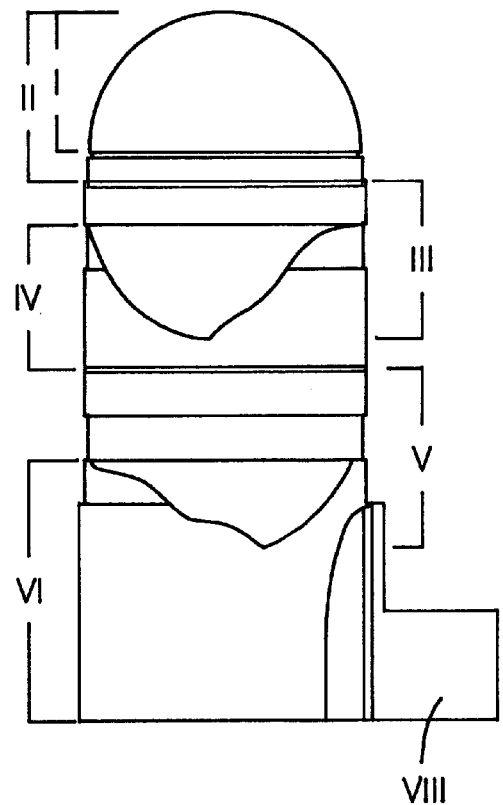
FIG. 36 is a sectional view ("36—36" with respect to the plan view of FIG. 37 of the apparatus of FIG. 35 denoting by reference numerals Roman I–VII) the preferred seven components of which components III and V (of the blow moulded components I–VI) (and possibly also VII) are provided with the shelf like regions provided by provision of the appropriate tear shaped openings depicted in the plan view 37.
Figure 37:
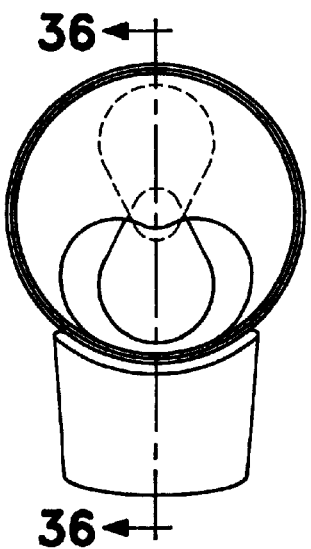
FIG. 37 is a plan view of the arrangement depicted in FIG. 35.
Figure 39:
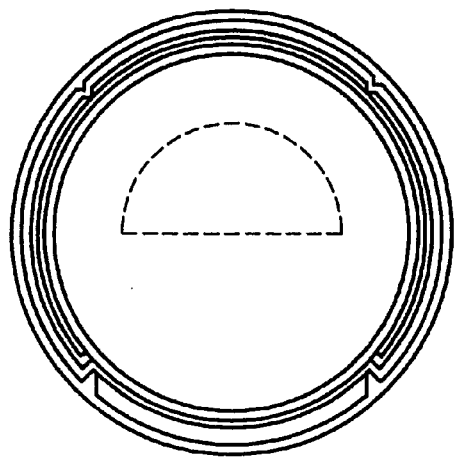
FIG. 39 is a plan view of the base unit of the embodiment shown in FIG. 38.
Figure 38:
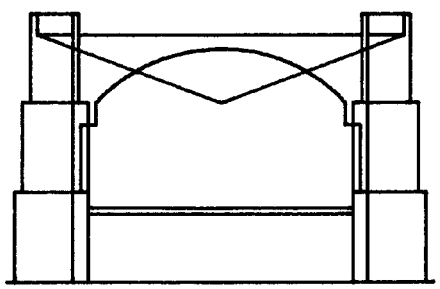
FIG. 38 is a front elevational view of a base unit of still a further preferred form of the present invention.
Figure 40:
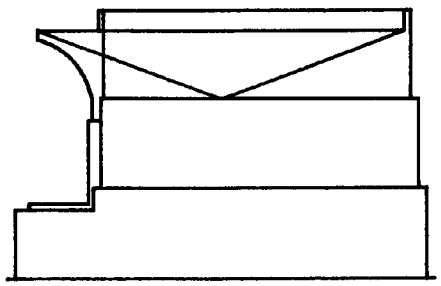
FIG. 40 is a section of the base unit of FIG. 38 taken at section "40—40" (see FIG. 56)
Figure 45:
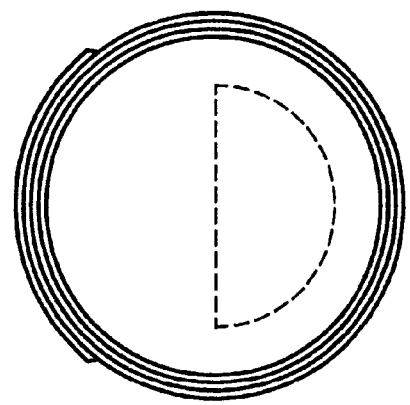
FIG. 45 is a plan view of the centre unit of FIG. 44.
Figure 46:
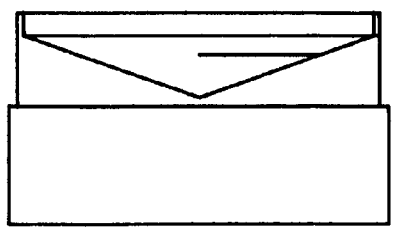
FIG. 46 is a section of the centre unit of FIG. 44.
Figure 44:
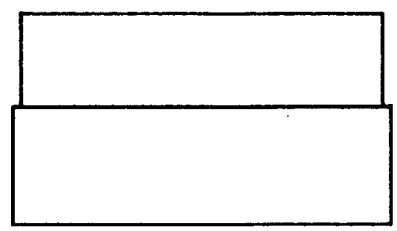
FIG. 44 is a front elevational view of a centre unit to be combined with the units of FIGS. 38 through 43.
Figure 48:
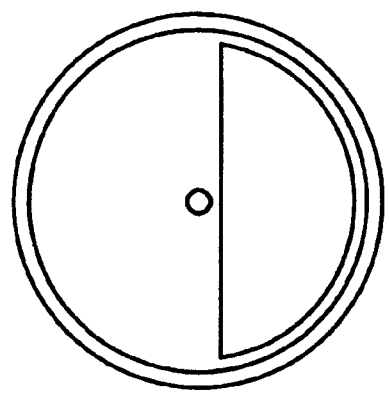
FIG. 48 is a plan view of the top unit of FIG. 47.
Figure 49:
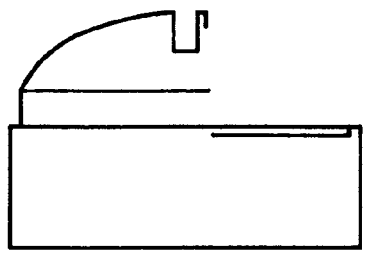
FIG. 49 is a section at (see FIG. 56) of the top unit of FIG. 47.
Figure 47:
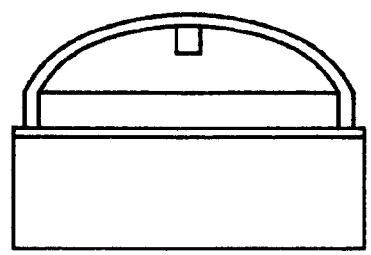
FIG. 47 is a front elevational view of a top unit to be used with the units of FIG. 38 through 46.

Another preferred form of the present invention is that depicted in FIGS. 35 through 37 where components I–VII are moulded of a suitable plastics material (for example a suitable light stabilised pvc or some other plastics polymer) where components can be made in pairs or the like so as to reduce the moulding steps and thereafter be machined as far as necessary to provide the required openings in the shelf like members (defined preferably in compoents III and V) to be spaced by spacer member IV (and to inturn include a top member with the inlet, the top member III being closeable by a rotational cover I.

The bottom shelf defining member V is supported on a pedestal or the like member VI in which an appropriate opening corresponding to the closure depicted in FIGS. 35 through 37 can be plug fitted, such a cover being stabilised by the step form of the element VII depicted in FIG. 36.

In use therefore, as with the earlier embodiments there is the sequential cascading of the material downwardly but there is no need for a rotational movement of the closure VII of the lower most element VI since the same need not be steadied and can be pulled away from the device and then reinserted as appropriate, the step form can preferably be used during a loading sequence if the access opening is presented to high for a particular person.

The preferred form of the present invention is that depicted in FIGS. 38 through 58 which provides an assemblable composter having the features of the present invention but having components capable of being formed from a suitable material such as a recycled plastics material (polyethylene) which can be formed by rotational moulding processes.

Figure 58:
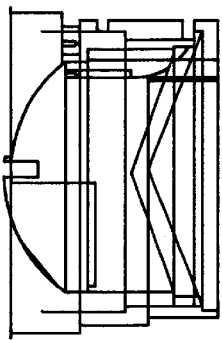
FIG. 58 is a diagram showing transparently the nestability of the various components of a composter of FIGS. 38 through 57 showing how at retail outlets the structure is capable of nested down to a size substantially no greater than the size of the largest component namely, the base unit.
Figure 55:
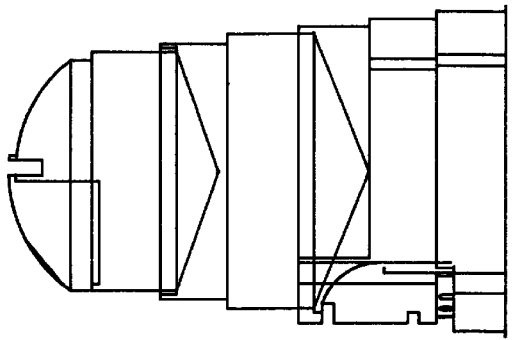
FIG. 55 is a sectional view of the erected composter of FIGS. 53 and 54.
Figure 57:
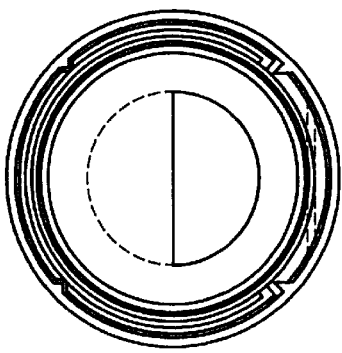
FIG. 57 is a section at "57—57" (see FIG. 54)
Figure 54:
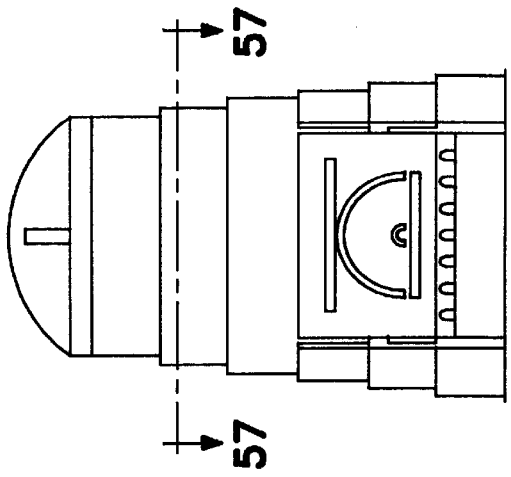
FIG. 54 is the front elevation of the assembled composter of FIG. 53.
Figure 56:
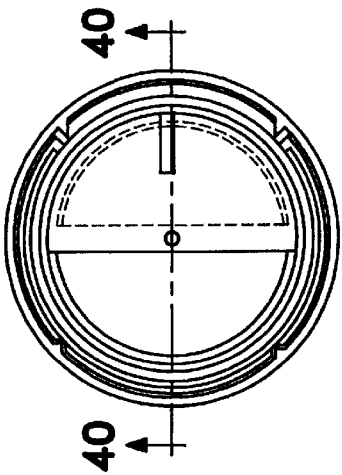
FIG. 56 is a plan view of the assemblies of FIGS. 53 through 55.
Figure 53:
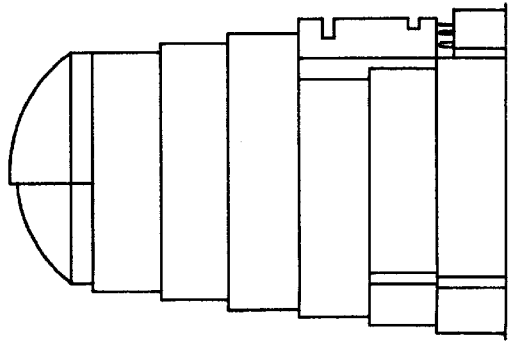
FIG. 53 is a side elevational view of an erected composter using the units of FIGS. 38 through 52.

The preferred form of the present invention as shown in FIGS. 38 through 58 lends itself to rotational moulding while providing as at least one enhancement a rotational lid which facilitates access and components capable of being nested/compacted as indicated by FIG. 58.

It is believed that the apparatus in accordance with the present invention should find widespread acceptance.

We claim:

1. A composter comprising
   at least three composting compartments in a vertical inter-relationship, the top most compartment including an inlet for material to be composted and the lowermost compartment including an outlet for removing composted material,
   each of the upper at least two compartments including an inclined shelf and at least one eccentrically positioned opening for receiving material being composted so that ongoing loading of material through said inlet cascades already present material, progressively downwardly through the upper at least two composting compartments in a direction towards said lower most composting compartment.

2. A composter as claimed in claim 1, wherein a cap is provided to close said inlet.

3. A composter as claimed in 1, wherein a panel is provided to close said outlet.

4. A composter as claimed in claim 1, wherein there are three composting compartments.

5. A composter as claimed in claim 1, wherein said composting compartments are round in plan.

6. A composter as claimed in claim 1, wherein said composting compartments are formed from a plurality of moulded components.

7. A composter of claim 6, wherein said moulded components are formed by rotational or blow moulding.

8. A composter of claim 6, wherein said components defining said at least three composting compartments are capable of being self nested with a like compartment.

9. A composter of claim 1, wherein said at least three composting compartments are nestable, one compartment within another.

10. A composter as claimed in claim 1, wherein said composter is formed of a plastics material.

11. A composter as claimed in claim 1, wherein there are only two shelves.

12. A composter as claimed in claim 1, wherein each said shelf is substantially bowl shaped.

13. A composter as claimed in claim 1, wherein said inlet is in the top of the upper most compartment.

14. A composter as claimed in claim 13, wherein a cover can be rotated about a substantially vertical rotational access to bring an opening into or out of register with said inlet.

15. A composter as claimed in claim 1, wherein said outlet is in a side wall of the lower most compartment; a panel being movable over said outlet or away from said outlet to allow the removal of composted or composting material from the lower most compartment.

16. As a composter as claimed in claim 1, wherein the ground provides a base of said lower most compartment.

17. As a marketable item a nested composter of claim 1, wherein the compartments are nested to reduce space requirements.

18. A composter comprising a container, a plurality of inclined shelves in said container, said shelves including at least one eccentrically positioned opening being positioned and the container being loadable such that in use material from a higher shelf can fall onto a lower shelf, said container having an outlet at or near the bottom thereof in use to enable composted material to be withdrawn from the container.

19. A composter comprising at least three composting compartments in a vertical inter-relationship, the top most compartment including an inlet for material to be composted and the lower most compartment including an outlet for removing composted material, between each of the compartments is located an inclined shelf having at least one eccentrically positioned opening so that ongoing loading of material through said inlet cascades already present material progressively downwardly through the composting compartments towards or into said lower most compartment.

* * * * *